United States Patent [19]

Lockshin

[11] 4,204,368
[45] * May 27, 1980

[54] LOUVERED WINDOW SHADE DEVICE

[76] Inventor: Robert E. Lockshin, 2025 NE. 154 St., North Miami Beach, Fla. 33162

[*] Notice: The portion of the term of this patent subsequent to Oct. 24, 1995, has been disclaimed.

[21] Appl. No.: 928,287

[22] Filed: Jul. 26, 1978

Related U.S. Application Data

[63] Continuation of Ser. No. 775,518, Mar. 8, 1977, Pat. No. 4,121,380, which is a continuation of Ser. No. 659,599, Feb. 20, 1976, abandoned.

[51] Int. Cl.$^2$ .............................................. E05C 7/02
[52] U.S. Cl. ...................................... 49/67; 296/95 R
[58] Field of Search ........................ 49/67, 62, 61, 71; 52/473; 296/95 R; D12/181, 182

[56] References Cited

U.S. PATENT DOCUMENTS

| | | | |
|---|---|---|---|
| 2,210,624 | 8/1940 | Kramer | 49/62 |
| 2,254,947 | 9/1941 | Judge et al. | 49/61 X |
| 2,264,014 | 11/1941 | Wohlfield | 296/95 R |
| 2,349,470 | 5/1944 | Stanfield | 49/67 X |
| 2,497,419 | 2/1950 | Schwartz | 49/71 |
| 4,023,309 | 5/1977 | Backward | 49/62 |
| 4,121,380 | 10/1978 | Lockshin | 49/67 |

OTHER PUBLICATIONS

"Chastains Shadow," Brochure for Rear Window Shade.
"Rear Window Sun Shade," Brochure for Rear Window Shade.

Primary Examiner—Philip C. Kannan
Attorney, Agent, or Firm—Shapiro and Shapiro

[57] ABSTRACT

A louvered window shade device for installation relative to the rear windows of automobiles, particularly of the body types commonly known as fast-backs, hatch-backs, etc., wherein substantial portions of the interior compartments thereof are normally exposed to the direct rays of the sun because of the acute angular relation of the windows to horizontal planes through the cars. A pair of elongated, angular mounting bars are force fitted between the outside surface of the rear window glass and the respective side lengths of the existing, resilient window trim strip. The upper ends of the mounting bars terminate in opposed, inwardly extending plates, similarly force fitted between the glass and the top portion of the trim strip, the main body portion of the louvered shade being hingedly connected at its upper end to the plates to provide for swinging movement thereof into and out of a covering relation to the rear window glass. A suitable latch device is provided to selectively maintain the main body portion of the louvered shade in a closed relation to the rear window.

7 Claims, 9 Drawing Figures

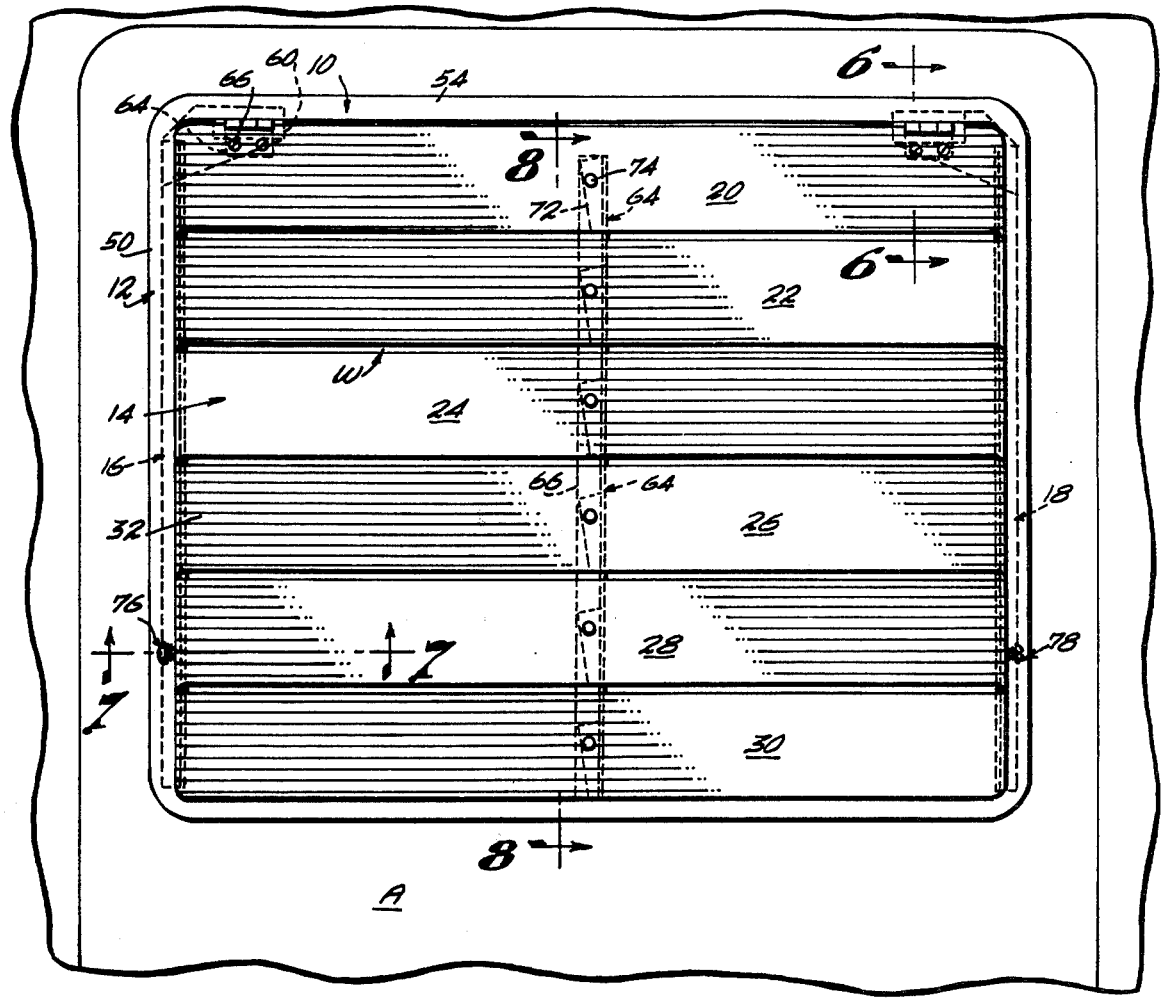
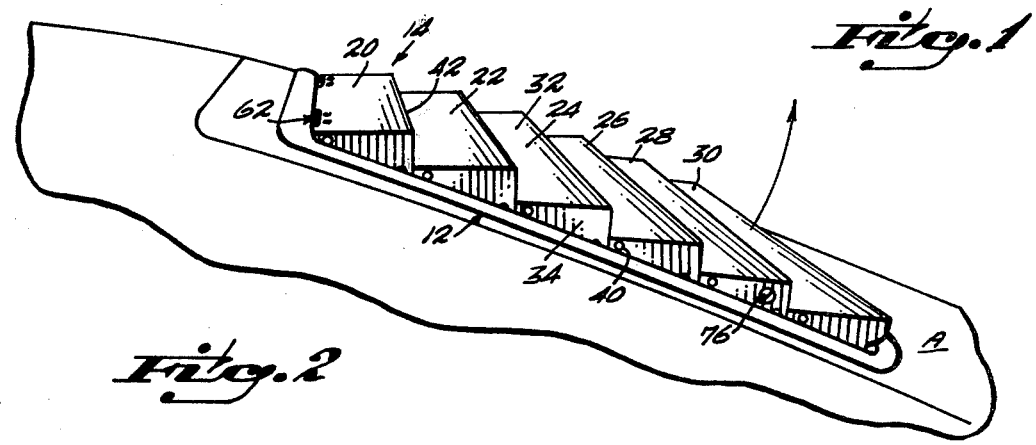
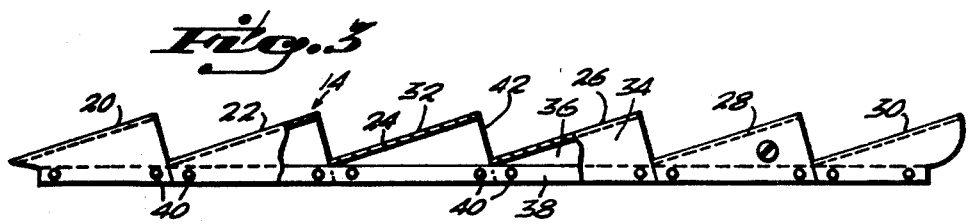

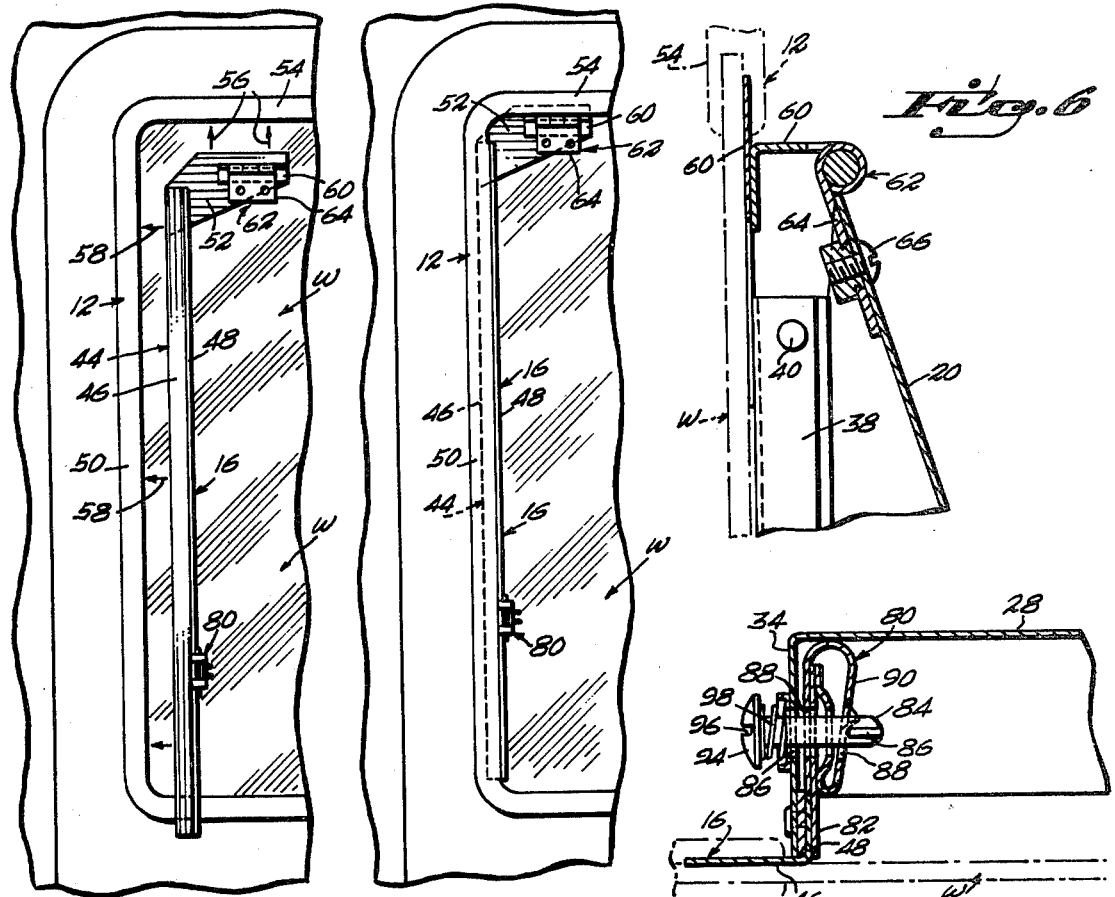

LOUVERED WINDOW SHADE DEVICE

This is a continuation application of Ser. No. 775,518, filed Mar. 8, 1977, now U.S. Pat. No. 4,121,380, issued Oct. 24, 1978, which is a continuation of Ser. No. 659,599, filed Feb. 20, 1976, now abandoned.

BACKGROUND OF THE PRESENT INVENTION

Louvered window shade devices for covering the rear windows of automobiles as conventionally employed generally require the drilling of holes through the body of a car to provide a hinged connection thereto. This, of course, is undesirable, however, it is essential to provide means to open the louvered shade to permit cleaning of the window.

The device of the present invention employs a pair of elongated, angular, mounting strips which are force fitted, respectively, between the outer surface of the rear window glass and the two side portions of the existing resilient window trim strip. Relatively short, oppositely, inwardly projecting plates, fixed to the top end portions of the respective mounting strips, are similarly force fitted under the upper end portions of the trim strip, and the main body portion of the louvered shade is hingedly connected to said plates.

Adjacent the lower end of the main body portion, a suitable lock or latch means is provided to simultaneously hold same in a closed relation to the rear window and to confine the angular mounting strips against accidental dislodgment from their positions between the glass and the resilient trim strip.

OBJECTS AND ADVANTAGES OF THE PRESENT INVENTION

One of the principal objects of the present invention is to provide a louvered window shade device for attachment relative to the rear window of an automobile without the necessity of drilling holes in or otherwise defacing the car body.

Another principal object of this invention is to provide a pair of mounting bars which are force fitted between the outer face of the rear window glass and the respective side portions of the existing window trim strip.

A still further object of the instant invention is to provide hinge means connecting between the mounting bars and the top edge portion of the main body portion of the louvered window shade to permit said main body portion to be swung between open and closed positions relative to the rear window, said hinge connection also serving to maintain the upper end portions of the mounting bars in place.

Yet another object of the present invention is to provide latch means to simultaneously maintain the main body portion of the louvered shade in a closed relation to the rear window and to maintain the louver end portions of the mounting bars in place.

BRIEF DESCRIPTION OF THE DRAWINGS

FIG. 1 is a top plan view of the louvered window shade device of the present invention, installed relative to the rear window of an automobile;

FIG. 2 is a side perspective view of the louvered shade installed as in FIG. 1;

FIG. 3 is a side elevational view of the main body portion of the louvered window shade with parts broken away to better illustrate the invention;

FIG. 4 is a fragmentary plan view of one side portion of the rear window of an automobile with one angle mounting bar of the present invention in a position about to be force fitted into position between the outer surface of the rear window glass and the existing window trim strip;

FIG. 5 is a view similar to FIG. 4 with the angle mounting bar in an installed position;

FIG. 6 is an enlarged cross sectional view taken along line 6—6 of FIG. 1;

FIG. 7 is an enlarged cross sectional view taken along line 7—7 of FIG. 1;

FIG. 8 is a cross sectional view taken along line 8—8 of FIG. 1; and

FIG. 9 is a top plan view, similar to FIG. 1, of a modified form of the present invention.

DETAILED DESCRIPTION OF THE DRAWINGS

With reference to the drawings in which like reference characters designate like or corresponding parts throughout the various views, and with particular reference to FIGS. 1 and 2, the louvered window shade device, indicated generally at 10, is illustrated fixed in a closed relation to the rear window W of an automobile A. The generally rectangular rear window W is mounted in a conventional manner, surrounded by a resilient peripheral trim strip 12.

The louvered window shade device 10 includes a main body assembly 14 and a pair of side, angular, mounting bar assemblies 16 and 18. Main body assembly 14 is comprised of a plurality of louvers such as 20, 22, 24, 26, 28 and 30. Each louver includes a top wall 32 and generally truncated, triangular downwardly turned, opposed end walls 34 and 36. As best illustrated in FIG. 3, the lower edges of the end walls 34 and 36 of louvers 20 through 30 are aligned and interconnected by respective tie bars such as 38, by rivets 40. In this manner, the plurality of louvers 20 through 30 are held side by side in a rigid, generally rectangular unitary assembly fitting window W as shown in FIG. 1.

As is generally conventional with louvered window shades of this nature, the angles of the end walls 34 and 36 and the acute angle of the rear window W are correlated to provide a minimum of obstruction to the driver's view through the rear window W via the open trailing end 42 of each louver. The top louver walls 32 will all be positioned in generally horizontal, parallel planes.

Mounting means for the main body assembly 14, at peripheral regions thereof, comprises the pair of angular mounting bars 16 and 18. With reference to FIGS. 4 and 5, the mounting bar assembly 16 will be described in detail. It is comprised of an elongated angle member 44 providing an outwardly extending web 46 and an upstanding web 48 which extend substantially along the length of the one side 50 of the resilient trim strip 12. A plate 52, fixed as by spot welding to the upper end portion of angle member 44, is angled inwardly along an end portion of the top run 54 of trim strip 12.

As indicated by arrows 56, the plate 52 is moved upwardly, and force fitted between an upper peripheral region of the outer surface of rear window W and one end portion of the top run 54 of trim strip 12. The mounting angle web 46 (a portion of which adjacent to a lower portion of the window serves as a latch-support plate, as described later) is then moved outwardly, indicated by arrows 58, and similarly force fitted between the side run 50 of trim strip 12 and a corresponding peripheral region of window W, whereupon, the mounting bar assembly 16 will be captivated in the position illustrated in FIG. 5, being held between the trim strip and the window as shown.

A short angle segment 60, forming a portion of a hinge assembly 62, is fixed as by spot welding along the outer face of plate 52, which serves as a hinge-support plate. A pivotal leaf 64 of hinge assembly 62 is fixed by screws 66 to one side of the upper edge portion of the top louver 20.

The other side mounting bar assembly 18 and its hinged attachment to the opposite side of the upper edge portion of top louver 20 is identical in all respects to the above description of mounting bar 16 and needs no further description. By virtue of the hinges 62 at upper peripheral regions of main body assembly 14, the main body assembly may be pivoted between open and closed positions relative to the window W.

A center brace 64, generally bisecting the length of the louvers 20 through 30, includes an elongated foot web 66, carrying a strip of a resilient material 68, fixed along its lower surface, an upstanding web segment 70, extending upwardly to each louver 20 through 30 and top angle segments 72 fixed against the underside of each louver by rivets 74.

With particular reference to FIGS. 1 and 7, identical latch devices 76 and 78, preferably positioned along the opposed louver edge portions of the device, serve to lock the main body assembly 14 to angle members 44 that serve as latch-support plates. These latches may be any of a variety of commercially available types, one of which is generally detailed in FIG. 7 and includes cooperating engageable means on the latch-support plate 44 and on the main body assembly 14 that are engaged when the main body assembly is closed relative to the window W. A spring type keeper device 80 is spot welded to a finger 82 which is in turn spot welded to the upstanding web 48 of a mounting bar such as 16. A latch pin 84 extends through respective holes 86 and 88 in one side louver wall such as 34 and the spring keeper 80. The inner end of latch pin 84 is provided with a pair of oppositely extending wings 86 (one shown) which are adapted to pass through a slot 88 in the inner portion 90 of spring keeper 80 in one position only. When the wings 86 are passed therethrough and the pin 84 is rotated through 45°, for example, the main body portion 14 is locked to the mounting bar 16 as illustrated. Latch pin 84 is provided with an outer head portion 94 which is preferably slotted at 96 for the reception of a suitable tool and is spring-loaded at 98. When the latch pin 84 is actuated to align the wings 86 with slot 88, the spring 98 automatically unlatches the main body portion 14 from the mounting bar 16 for pivotal movement about the top hinge connections 62.

Since the latch-support plates and the engageable means thereon are moved along the window W independently of the engageable means on the main body assembly 14 during the mounting of the latch-support plates on the window, as shown in FIGS. 4 and 5, the latch-support plates may be inserted between the trim strip and the window independently of the main body assembly and then the engageable means on the latch-support plates may be engaged with the engageable means on the main body assembly when the main body assembly is closed relative to the window, as shown in FIG. 7. It should be noted that the top hinge connection previously described, and the locked engagement of the latch devices 76 and 78 secure the mounting bars 16 and 18 in place between the outer surface of the rear window and the resilient trim strip 12.

The modified form of the invention illustrated in FIG. 9 is identical with the preferred form as above described with the exception that the louvered main body portion 14' is hinged at 62' to the mounting bar assemblies 16' and 18' along a first side edge of the rear window, said mounting bars 16' and 18' being mounted, respectively, along the top and bottom edges of the rear window. Latch devices 76' and 78' are disposed along the top and bottom window edges adjacent the second side edge thereof.

As illustrated in the drawings, the louvered screen device is substantially rectangular in configuration. However it should be understood that this configuration can vary to conform with the configurations of the rear windows of various automobile makes and models, for example, the width of the upper and lower edges may vary somewhat resulting in the corner angles being more or less than 90 degrees.

What is claimed is:

1. A louvered window shade device for mounting relative to an automobile window having a peripheral trim strip, comprising a main body assembly including a plurality of louvers interconnected side by side to form a unitary assembly, mounting means for peripheral regions of the main body assembly and including hinge-support plate means for insertion between the trim strip and corresponding peripheral regions of the window and latch-support plate means for insertion between the trim strip and corresponding peripheral regions of the window remote from the first-mentioned peripheral regions, hinge means for interconnecting peripheral regions of the main body assembly and the hinge-support plate means to permit the main body assembly to be pivoted on the hinge-support plate means between open and closed positions relative to the window, and latch means having cooperating engageable means on the main body assembly and on the latch-support plate means that are engaged when the main body assembly is closed relative to the window, the latch-support plate means and the engageable means thereon being movable along the window independently of the engageable means on the main body assembly so that the latch-support plate means may be inserted between the trim strip and the window independently of the main body assembly and then the engageable means on the latch-support plate means may be engaged with the cooperating engageable means on the main body assembly, the latch means and the hinge means securing the main body assembly to the mounting means so that the louvered window shade device is held in place on the window.

2. A louvered window shade device in accordance with claim 1, wherein said window is a generally rectangular rear window of an automobile and the main body assembly is a generally rectangular assembly fitting the window with the louvers horizontally disposed, wherein the hinge-support plate means is located adjacent to an upper portion of the window and the latch-support plate means is located adjacent to a lower portion of the window and wherein the peripheral regions of the main body assembly interconnected to the hinge-support plate means by the hinge means are upper peripheral regions of the main body assembly.

3. A louvered window shade device in accordance with claim 2, wherein the mounting means comprises a pair of mounting bars each including a hinge-support plate means at one end thereof and a latch-support plate means connected to the hinge-support plate means, the hinge-support plate means being inserted between the trim strip and upper regions of the window and the latch-support plate means of the respective mounting bars being inserted between the trim strip and opposite side regions of the window.

4. A louvered window shade device in accordance with claim 2, wherein the louvers are interconnected at their ends along opposite sides of the main body assembly and the latch means includes a pair of latches adjacent to opposite sides of the main body assembly.

5. A louvered window shade device in accordance with claim 1, wherein said trim strip comprises resilient material which holds the plate means against the window.

6. A louvered window shade device in accordance with claim 1, wherein the hinge means interconnects the hinge-support plate means and the main body assembly by fastener means that permits the hinge-support plate means to be mounted on the window before the main body assembly is interconnected with the hinge-support plate means by the hinge means.

7. A louvered window shade device in accordance with claim 1, wherein the louvers have end walls and wherein the engageable means on the main body assembly are supported on louver end walls.

* * * * *